(12) United States Patent
Wieclawski

(10) Patent No.: US 7,134,716 B2
(45) Date of Patent: Nov. 14, 2006

(54) HEADREST SEAT-BACK ARRANGEMENT

(75) Inventor: Stanislaw Andrzej Wieclawski, Riedstadt (DE)

(73) Assignee: Lear Corporation, Southfield, MI (US)

( * ) Notice: Subject to any disclaimer, the term of this patent is extended or adjusted under 35 U.S.C. 154(b) by 77 days.

(21) Appl. No.: 10/306,119

(22) Filed: Nov. 27, 2002

(65) Prior Publication Data

US 2004/0100133 A1 May 27, 2004

(51) Int. Cl.
*B60N 2/42* (2006.01)

(52) U.S. Cl. ............ 297/216.12; 297/408; 297/216.13; 297/216.14

(58) Field of Classification Search ........... 297/216.12, 297/410, 216.1, 216.13, 216.14, 396, 408, 297/61, 216.18, 452.13, 452.14, 452.31, 297/452.56, 403, 406
See application file for complete search history.

(56) References Cited

U.S. PATENT DOCUMENTS

| | | | | |
|---|---|---|---|---|
| 3,588,172 A | * | 6/1971 | McGregor | 297/362.13 |
| 3,627,379 A | * | 12/1971 | Faust | 297/284.4 |
| 3,802,737 A | | 4/1974 | Mertens | |
| 4,380,352 A | * | 4/1983 | Diffrient | 297/61 |
| 5,213,395 A | * | 5/1993 | Korteweg et al. | 297/328 |
| 5,346,283 A | * | 9/1994 | Steininger et al. | 297/408 |
| 5,722,722 A | * | 3/1998 | Massara | 297/216.13 |
| 5,772,280 A | * | 6/1998 | Massara | 297/216.12 |
| 5,772,281 A | | 6/1998 | Massara | |
| 5,826,937 A | | 10/1998 | Massara | |
| 5,884,968 A | | 3/1999 | Massara | |
| 5,927,804 A | * | 7/1999 | Cuevas | 297/216.12 |
| 6,019,424 A | | 2/2000 | Ruckert et al. | |
| 6,022,074 A | | 2/2000 | Swedenklef | |
| 6,024,406 A | | 2/2000 | Charras et al. | |
| 6,135,561 A | | 10/2000 | Kruger et al. | |
| 6,199,947 B1 | | 3/2001 | Wiklund | |
| 6,213,549 B1 | | 4/2001 | Wieclawski | |
| 6,250,714 B1 | | 6/2001 | Nakano et al. | |
| 6,309,018 B1 | | 10/2001 | Jernstrom | |
| 6,375,262 B1 | | 4/2002 | Watanabe | |
| 6,398,299 B1 | * | 6/2002 | Angerer et al. | 297/216.12 |
| 6,416,125 B1 | | 7/2002 | Shah et al. | |
| 6,550,865 B1 | * | 4/2003 | Cho | 297/408 |
| 6,565,150 B1 | * | 5/2003 | Fischer et al. | 297/216.12 |
| 6,604,788 B1 | * | 8/2003 | Humer | 297/216.13 |
| 6,631,949 B1 | * | 10/2003 | Humer et al. | 297/216.12 |
| 6,755,467 B1 | * | 6/2004 | Chu | 297/284.1 |

FOREIGN PATENT DOCUMENTS

DE 30 45 391 A1 6/1982

(Continued)

*Primary Examiner*—Laurie K. Cranmer
(74) *Attorney, Agent, or Firm*—Earl LaFontaine

(57) ABSTRACT

An automotive seat assembly 10 is provided, including a primary seat structure 12 having a seatbase portion 14 and a seatback portion 16. The present invention further includes a headrest support assembly 26 including an upper headrest support section 28 and a lower headrest support section 30 rotatable about a headrest pivot point 34 positioned between the upper headrest support section 28 and the lower headrest support section 30. An energy absorbing deformable plate 40 is mounted to the lower headrest support section 30 at an upper plate end 42 and is mounted to the primary seat structure 12 at a lower plate end 44. The energy absorbing deformable plate 40 is deformable rearwards 43 during a rear-end collision. As the energy absorbing deformable plate 40 deforms rearward, the upper plate end 42 moves the lower headrest support section 30 rearward and the upper headrest support section 28 is thereby rotated forward.

15 Claims, 3 Drawing Sheets

FOREIGN PATENT DOCUMENTS

| | | |
|---|---|---|
| DE | 3131633 A1 * | 2/1983 |
| DE | 3802737 A1 | 8/1989 |
| DE | 197 81 991 T 1 | 3/1998 |
| DE | 298 11 127 U 1 | 8/1998 |
| EP | 0 627 340 A1 | 12/1994 |
| GB | 2 371 223 A | 7/2002 |
| GB | 2 373 177 A | 9/2002 |
| JP | A-2001-38233 | 2/2001 |
| JP | A-2002-12073 | 1/2002 |
| JP | A-2002-43832 | 2/2002 |
| JP | A-2002-67763 | 3/2002 |
| JP | A-2002-74843 | 3/2002 |
| WO | WO 02/074579 | 9/2002 |

* cited by examiner

HEADREST SEAT-BACK ARRANGEMENT

TECHNICAL FIELD

The present invention relates generally to an automotive vehicle seat-back assembly and more specifically to an automotive vehicle seat-back assembly with integrated headrest and seat-back interaction.

BACKGROUND OF THE INVENTION

Automotive vehicle design is often governed by numerous diverse design objectives. Components comprising the automobile must often meet criteria ranging from strength and durability to style and comfort. Automotive designers and engineers are, therefore, attune to the fact that the vehicle as a whole as well as individualized components must interact with vehicle passengers to provide a plurality of benefits. One significant design category centers around passenger safety.

Although modern vehicle designs typically represent the pinnacle of passenger safety, automotive designers constantly strive to further reduce any impact on vehicle passengers stemming from a vehicle accident or collision. In this light there has been increased attention in reducing the impact of traffic incidents on passengers within the vehicle stemming from commonly occurring incidents such as rear-end collisions. Without proper consideration, rear-end collisions can subject passengers to stresses in the neck or cervical column and on occasion may result in injuries commonly referred to as whiplash. Modern vehicle design has addressed these considerations through a variety of approaches ranging from energy absorbing bumpers to improved car-seat design.

The goal of each of these approaches is to minimize any violent relative movement between a passenger's body and head. One successful approach to limiting such movement has been through the use of a head-rest assembly mounted to the vehicle seat. Although statically placed head-rest assemblies can provide a considerable level of whiplash protection, it is known that further development of both the vehicle seat and head-rest assembly can serve to further reduce the amount relative motion experienced by passengers. One known development moves the headrest forward to engage the passenger's head during rear-impact collisions. A variety of approaches have been proposed in order to facilitate the forward motion of the headrest including activation due to the passenger's rearward motion.

What many of these approaches fail to adequately address is the passenger's penetration into the seat during the rear-impact collision. The passenger's penetration into the seat can potentially serve as more than simply an activation of the headrest forward motion. The passenger penetration, if properly controlled, can help control the relative position of the passenger neck and body to further reduce the impact of the collision. Furthermore, passenger penetration could benefit from an assembly that helped absorb the energy of the passenger's movement to reduce the overall impact or shock on the passenger due to a rear-end collision. These improvements could be utilized to further reduce the impact of a collision on a vehicle passenger and thereby increase a designs value and benefits.

It would therefore be highly desirable to have an automotive seat-back assembly that reduced the relative motion of a passenger's neck and body during rear-impact collisions. It would further be highly desirable to develop an automotive seat-back assembly that controlled passenger penetration into the seat-back during rear-impact collisions to absorb energy from the passenger and further reduce the impact of the collision.

SUMMARY OF THE INVENTION

It is therefore an object to the present invention to provide an automotive seat assembly reducing the relative motion of a passenger's neck and body during rear-end collisions. It is further object to the present invention to provide an automotive seat assembly providing improved control over passenger penetration during rear-end collisions.

In accordance with the objects of the present invention an automotive seat assembly is provided. The automotive seat assembly includes a primary seat structure including a seatbase portion and a seatback portion. The automotive seat assembly further includes a headrest support assembly including an upper headrest support section and a lower headrest support section rotatable about a headrest pivot point positioned between the upper headrest support section and the lower headrest support section. The headrest support assembly is rotatably mounted to the seatback portion. An energy absorbing deformable plate is mounted to the lower headrest support section at an upper plate end and is mounted to the primary seat structure at a lower plate end. The energy absorbing deformable plate is deformable rearwards during a rear-end collision. As the energy absorbing deformable plate deforms rearward, the upper plate end moves the lower headrest support section rearward and the upper headrest support section is thereby rotated forward.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
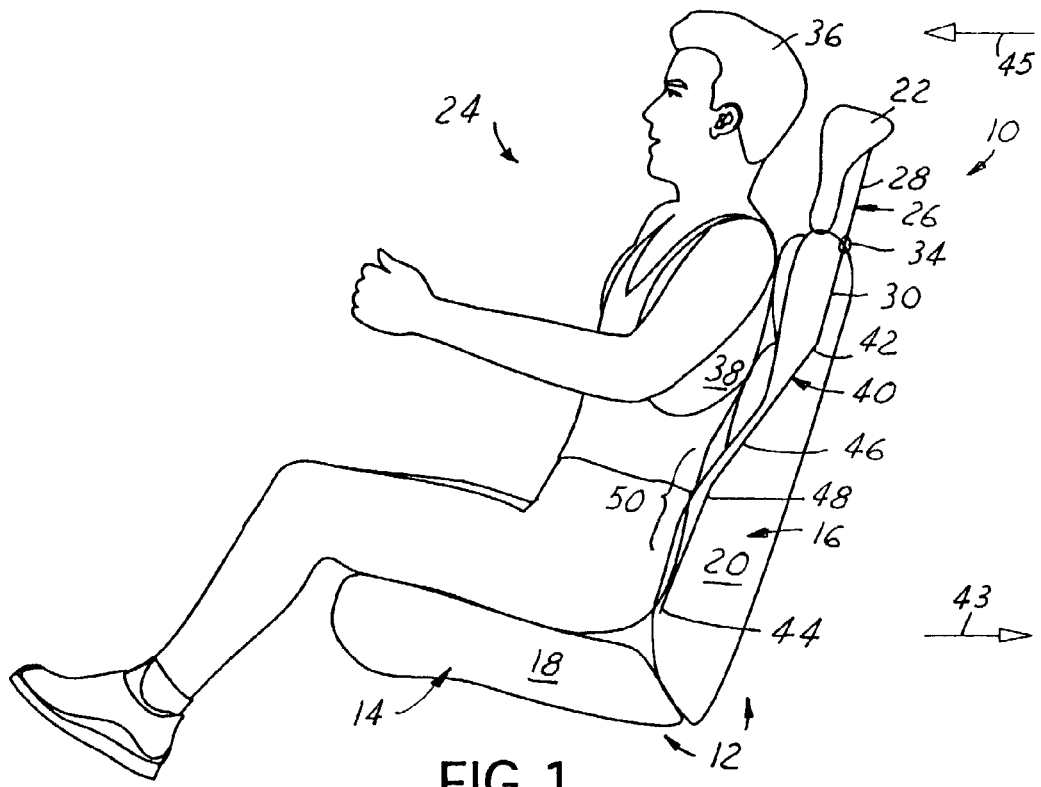
FIG. 1 is an illustration of an automotive seat assembly in accordance with the present invention.
Figure 2:
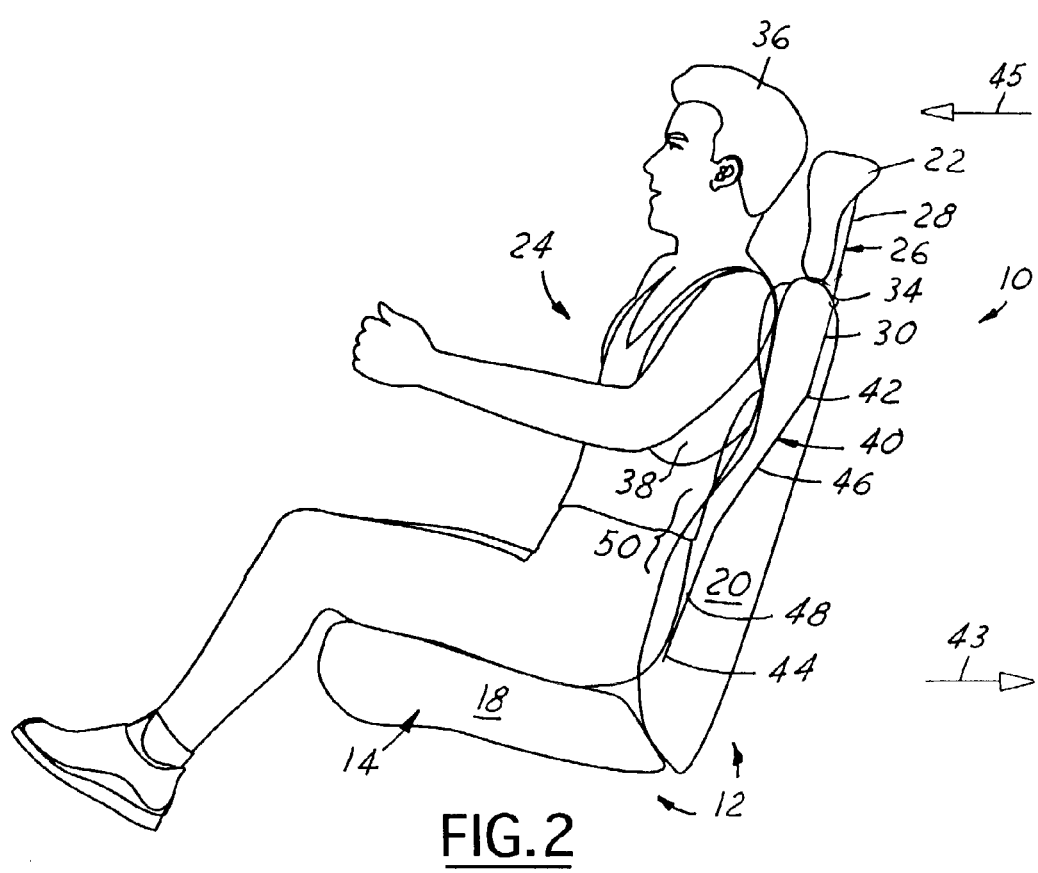
FIG. 2 is an illustration of the an automotive seat assembly illustrated in FIG. 1, the automotive seat assembly illustrated in a first sequential time-step after rear-impact.
Figure 3:
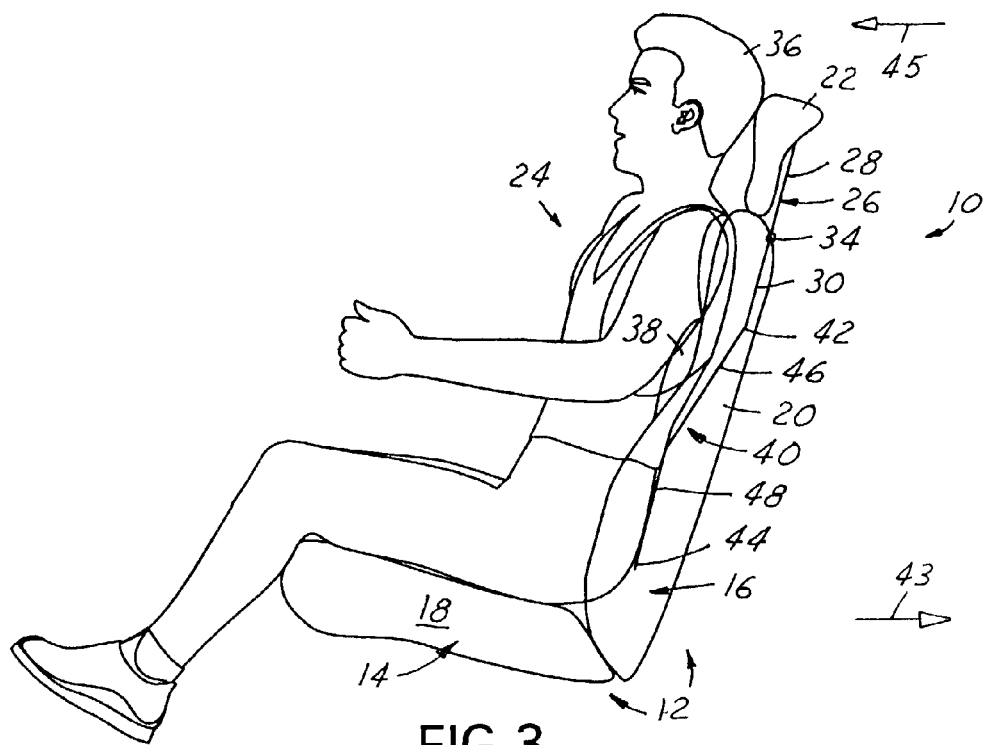
FIG. 3 is an illustration of the an automotive seat assembly illustrated in FIG. 1, the automotive seat assembly illustrated in a second sequential time-step after rear-impact.
Figure 4:
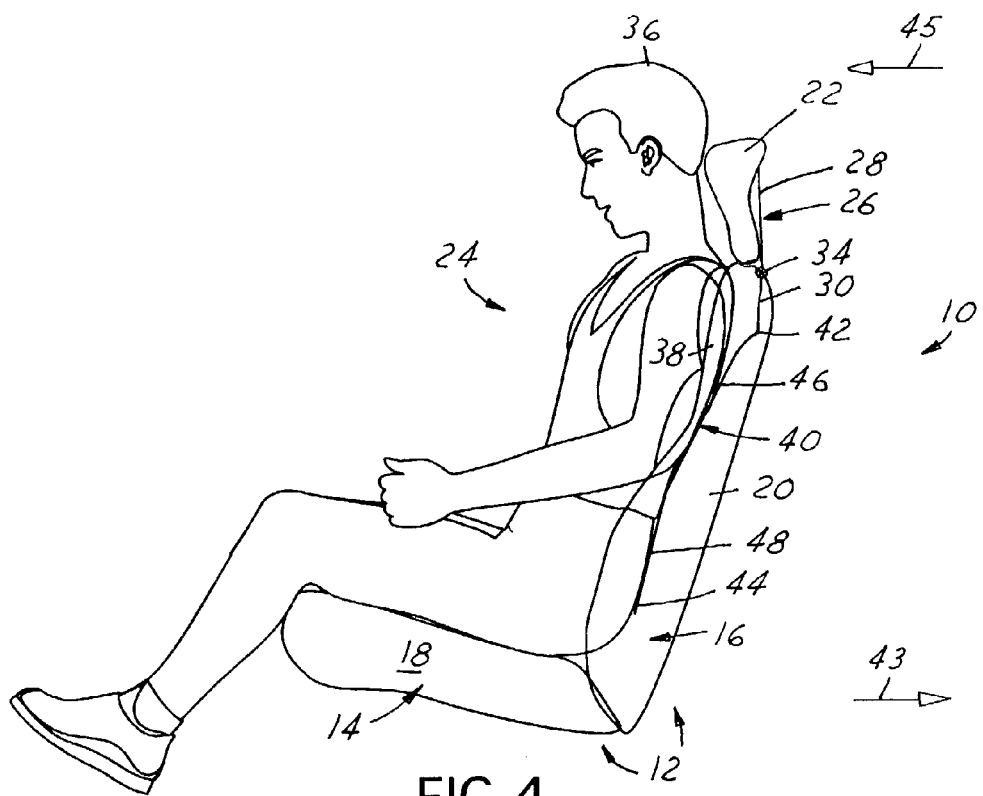
FIG. 4 is an illustration of the an automotive seat assembly illustrated in FIG. 1, the automotive seat assembly illustrated in a third sequential time-step after rear-impact.

Referring now to FIG. 1, which is an illustration of an automotive seat assembly 10 in accordance with the present invention. The automotive seat assembly 10 is intended for use in a wide variety of transportation applications including, but not limited to, passenger vehicles. The automotive seat assembly 10 includes a primary seat structure 12 comprised of a seatbase portion 14 and a seatback portion 16. The general makeup and interaction of seatbase portions 14 and seatback portions 16 are contemplated to encompass a wide variety of embodiments including movement, adjustment, and comfort features. A padded seat element 18, a padded back element 20 and a padded head-rest element 22 are only a few of the features contemplated by the present invention.

The present invention, however, also includes a unique design that helps reduce impact on a passenger 24 during rear-impact collision. The automotive seating assembly 10, therefore, includes a headrest support assembly 26 having an upper headrest support section 28 and a lower headrest support section 30 (see also FIG. 5). A pair of headrest adjustment pillars 32 may be mounted to the upper headrest support section 28 such that the padded head-rest element 22 can be adjusted vertically for passenger 24 comfort after installation in a vehicle. The headrest support assembly 26 is rotatable about a headrest pivot point 34 positioned between the upper headrest support portion 28 and the lower headrest support section 30. This allows the upper headrest support portion 28 to be rotated forward 45 such that the padded head-rest element 22 can engage the passenger's head 36 during a rear-end collision to minimize relative motion between the head 36 and back 38 of the passenger 24.

Although it is well known that movement of the head-rest element 22 forward can minimize relative motion of the passenger 24, considerable effort has been expended to control the actuation of such forward movement. The present addresses this concern through the incorporation of passenger penetration control with padded head-rest element 22 forward motion. This is accomplished through the inclusion of an energy absorbing deformable plate 40 positioned within the seatback portion 16 of the automotive seat assembly 10. The energy absorbing deformable plate 40 is mounted to the lower headrest support section 30 on an upper plate end 42 and is mounted to the primary seat structure 12 on a lower plate end 44. Although the lower plate end 44 could be mounted to any portion of the primary seat structure 12, it is preferable that it is mounted to the seatback portion 16. In this fashion, passenger 24 adjustment of the relative position between the seatback portion 16 and the seatbase portion 14 during operation of the vehicle will not impact the relative position of the energy absorbing deformable plate 40.

The energy absorbing deformable plate 40 by way of its mounting to the seatback portion 16 at the lower plate end 44 and it mounting to the lower headrest support section 30 at the upper plate end 42 absorbs energy from the passenger 24 and prevents excess penetration of the passenger 24 into the seat assembly 10 during rear-impact. Additionally, as the energy absorbing deformable plate 40 deforms rearward 43 due to the momentum of the passenger (see FIGS. 1–4 for a sequential illustration of the passenger 24 moving rearward 43 after a rear-end collision), the deformable plate 40 forces the lower headrest support section 30 rearwards 43. As the lower headrest support section 30 moves rearwards, the upper headrest support section 28 is moved forwards 45 due to rotation of the headrest support assembly 26 about the headrest pivot point 34. The forward motion of the upper headrest support section 28 brings the padded head-rest element 22 forward 45 and into contact with the passenger's head 36. In this fashion, the deformable plate 40 serves to absorb energy from the passenger 24, prevent the passenger 24 from excessively penetrating into the seat assembly 10, and prevents excessive relative movement of the passenger's head 36. The energy absorbing deformable plate 40 extends the lower headrest support section 30 effectively to a very low position on the seatback portion 16. This makes possible very fast forward movement of the headrest element 22. The lower headrest support section 30 often cannot go outside the seat contour if necessary (padded back element 20) due to space requirements (especially in rear seat arrangements). The present invention thereby increases forward motion of the headrest element 22 without requiring excess motion of the lower headrest support section 30.

Although it is contemplated that the energy absorbing deformable plate element 30 may be formed in a variety of forms and configurations, one embodiment contemplates the deformable plate element 30 comprising an angled upper portion 46 and a lower lumbar portion 48 extending forward of the headrest support assembly 26. In this fashion the deformable plate element 30 engages the lower lumbar region 50 of the passenger 24 first, an area often associated with excessive passenger penetration in prior art automotive seats. Passengers 24 often start the rearward movement from the H-point (hip-hinge point just above the seat pan) and the rest of the passenger's body follows. The effectively lowered impact plate (deformable plate 40) institutes movement of the headrest element 22 in response to as low as possible an impact from the passenger 24. In addition, the occupant is better matched and supported to the seatback during crash. As the passenger 24 proceeds rearward 43, the deformable plate element 30 conforms to the passenger's back 38 and thereby supports the passenger 24 while absorbing momentum energy. Although the deformable plate element 30 may be designed with a variety of resistance/deflection curves, in one embodiment it is contemplated that the deformable plate element 30 is formed to increase in rigidity as it deflects rearward 43. This serves to create a limit on passenger penetration as well as create an energy-absorbing characteristic.

Figure 5:
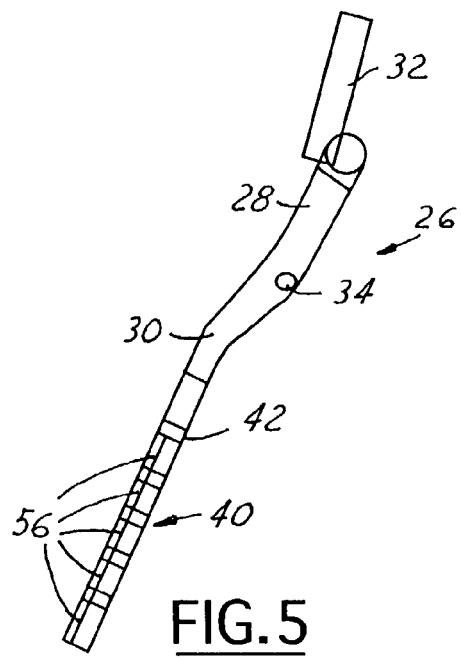
FIG. 5 is a side view detail of an embodiment of the rotatable headrest support assembly and energy absorbing deformable plate for use in the automotive seat assembly in accordance with the present invention.
Figures 6, 7:
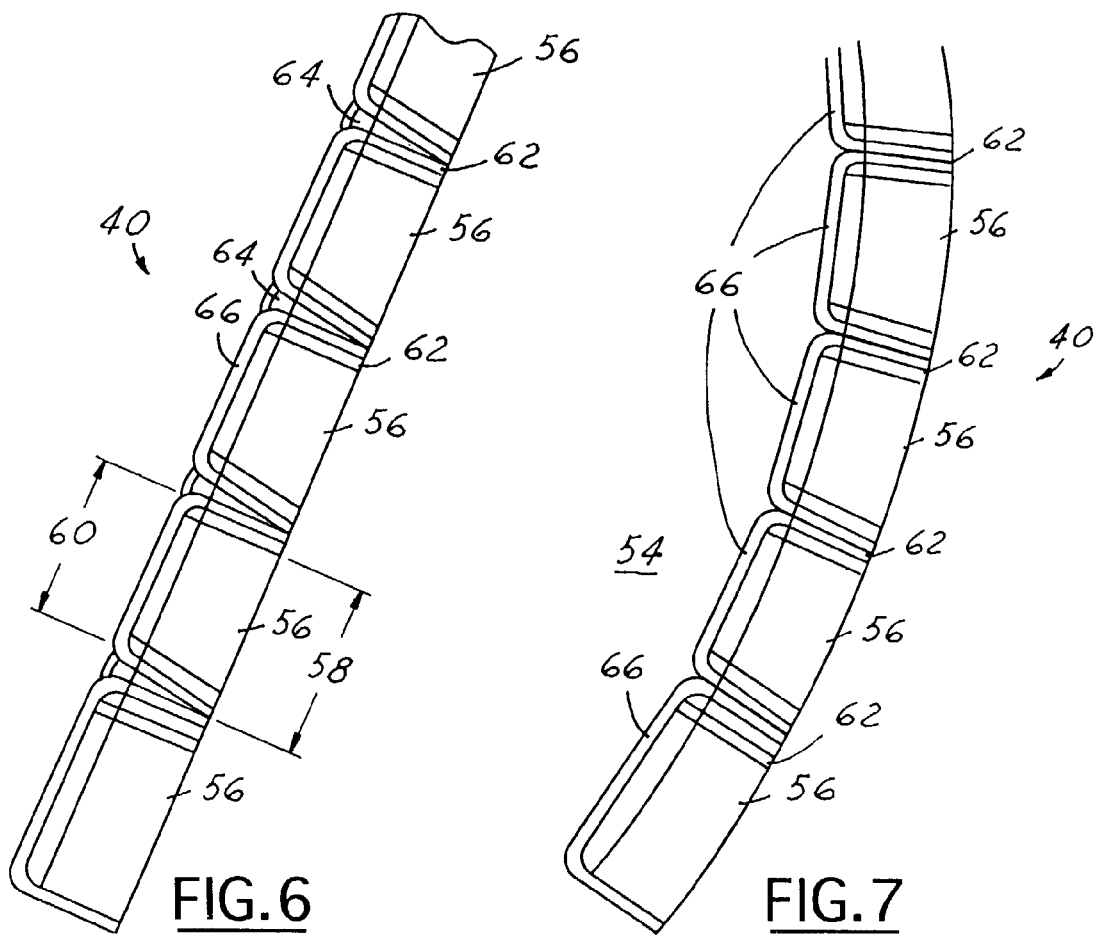
FIG. 6 is a side view detail of the energy absorbing deformable plate illustrated in FIG. 5, the energy absorbing deformable plate illustrated in a pre-impact condition.
FIG. 7 is a side view detail of the energy absorbing deformable plate illustrated in FIG. 5, the energy absorbing deformable plate illustrated in a post-impact condition.

The energy absorbing deformable plate element 30 can be formed from a variety of materials in a variety of configurations in order to create the desirable characteristic of increased rigidity in response to rearward 43 deflection. FIGS. 5 through 7 illustrate one particular configuration. In FIGS. 5 and 6 the energy absorbing deformable plate 30 is illustrated in an undeformed state 52, while FIG. 7 illustrates a deformed state 54. The energy absorbing deformable plate 30 includes a plurality of horizontally disposed trapezoidal elements 56 each having a base dimension 58 greater than a top dimension 60. The horizontally disposed trapezoidal elements 56 are joined along their bases 62 and positioned when in the undeformed state 52 such that consecutive trapezoidal elements 56 create a gap 64 between their respective tops 66. This allows the individual horizontally disposed trapezoidal elements 56 to pivot relative to each other until the gaps 64 close (see FIG. 7) and the rigidity of the energy absorbing deformable plate element 40 is thereby increased. In order for such deflection to result in an increase in rigidity, it is logical that the horizontally disposed trapezoidal elements 56 are orientated such that the gaps 64 are positioned facing the passenger 24.

The increasing rigidity of the deformable plate element 40 increases the effectiveness of the movable padded head-rest element 22 by transferring more of the passenger's 24 momentum into the rotatable headrest support assembly 26. Additionally, as the rigidity of the deformable plate element 40 increases due to deformation, energy is gradually absorbed from the passenger 24 and the passenger is prevented from penetrating too far into the seat assembly 10. Also, as the horizontally disposed trapezoidal elements 56 can deform individually in a local fashion as well as in a group nature, the deformable plate element 40 conforms to the passenger's body/back 38 and thereby provides more desirable support that oft found in prior designs. In addition standard elements such as springs, padding, heating elements, and adjustment controls can be used in conjunction with the disclosed elements such that the automotive seat assembly 10 functions in accordance with customer expectations and desires during normal operation. The deformable plate element 40 and the rotatable headrest support assembly 26 collaboration can be positioned within the seatback portion 16 such that they remain unnoticed and only come into play when a rear-impact scenario of sufficient magnitude to result in passenger 24 penetration of the seatback portion 16 occurs.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An automotive seat assembly comprising:
    a primary seat structure including a seatbase portion and a seatback portion;
    a headrest support assembly including an upper headrest support section and a lower headrest support section, said headrest support assembly rotatable about a headrest pivot point positioned between said upper headrest support section and said lower headrest support section; and
    an energy absorbing deformable plate mounted to said lower headrest support section at an upper plate end and mounted to said primary seat structure at a lower plate end, said energy absorbing deformable plate deforming in a first direction only during a rear-end collision and thereby moving said lower headrest support section such that said upper headrest support section is rotated in a second direction opposite said first direction, said energy absorbing deformable plate absorbing passenger momentum energy during rear-end collision;
    wherein said energy absorbing deformable plate increases in rigidity as it deforms in said first direction.

2. An automotive seat assembly comprising:
    a primary seat structure including a seatbase portion and a seatback portion;
    a headrest support assembly including an upper headrest support section and a lower headrest support section, said headrest support assembly rotatable about a headrest pivot point positioned between said upper headrest support section and said lower headrest support section; and
    an energy absorbing deformable plate mounted to said lower headrest support section at an upper plate end and mounted to said primary seat structure at a lower plate end, said energy absorbing deformable plate defoaming in a first direction during a rear-end collision and thereby moving said lower headrest support section such that said upper headrest support section is rotated in a second direction opposite said first direction, said energy absorbing deformable plate absorbing passenger momentum energy during rear-end collision;
    wherein said energy absorbing deformable plate conforms to a passenger's back when deforming.

3. An automotive seat assembly comprising:
    a primary seat structure including a seatbase portion and a seatback portion;
    a headrest support assembly including an upper headrest support section and a lower headrest support section, said headrest support assembly rotatable about a headrest pivot point positioned between said upper headrest support section and said lower headrest support section; and
    an energy absorbing deformable plate mounted to said lower headrest support section at an upper plate end and mounted to said primary seat structure at a lower plate end, said energy absorbing deformable plate deforming in a first direction during a rear-end collision and thereby moving said lower headrest support section such that said upper headrest support section is rotated in a second direction opposite said first direction;
    wherein said energy absorbing deformable plate comprises:
    a plurality of horizontally disposed elements flexibly joined to each other to create a deformable plate.

4. An automotive seat assembly as described in claim 3, wherein said plurality of horizontally disposed elements comprise:
    a plurality of horizontally disposed trapezoidal elements each having a base and a top, said base having a base dimension greater than a top dimension, said plurality of horizontally disposed trapezoidal elements joined along said bases and orientated such that a plurality of gaps are formed between consecutive of said tops.

5. An automotive seat assembly as described in claim 4, wherein said plurality of gaps face in said second direction.

6. An automotive seat assembly as described in claim 4, wherein said energy absorbing deformable plate increases in rigidity as said plurality of gaps close due to deformation of said energy absorbing deformable plate.

7. An automotive seat assembly comprising;
    a primary seat structure including a seatbase portion and a seatback portion;
    a headrest support assembly including an upper headrest support section and a lower headrest support section, said headrest support assembly rotatable about a headrest pivot point; and
    an energy absorbing deformable plate mounted to said lower headrest support section at an upper plate end and mounted to said primary seat structure at a lower plate end, said energy absorbing deformable plate increasing in rigidity as it deforms in a first direction during a rear-end collision, said energy absorbing deformable plate moving said lower headrest support section during deformation such that said upper headrest support section is rotated in a second direction opposite said first direction.

8. An automotive seat assembly as described in claim 7, wherein said lower plate end is mounted to said seatback portion.

9. An automotive seat assembly as described in claim 7, further comprising:
    at least one headrest adjustment pillar mounted to said upper headrest support section; and
    a padded headrest element mounted to said at least one headrest adjustment pillar.

10. An automotive seat assembly as described in claim 7, wherein said energy absorbing deformable plate:
    an angled upper portion; and
    a lower lumbar portion mounted to said angled upper section and positioned forward in said second direction of said headrest support assembly.

11. An automotive seat assembly as described in claim 7, wherein said energy absorbing deformable plate conforms to a passenger's back when deforming.

12. An automotive seat assembly as described in claim 7, wherein said energy absorbing deformable plate comprises:
 a plurality of horizontally disposed elements flexibly joined to each other to create a deformable plate.

13. An automotive seat assembly as described in claim 12, wherein said plurality of horizontally disposed elements comprise:
 plurality of horizontally disposed trapezoidal elements each having a base and a top, said base having a base dimension greater than a top dimension, said plurality of horizontally disposed trapezoidal elements joined along said bases and orientated such that a plurality of gaps are formed between consecutive of said tops.

14. An automotive seat assembly as described in claim 13, wherein said plurality of gaps face in said second direction.

15. An automotive seat assembly as described in claim 13, wherein said energy absorbing deformable plate increases in rigidity as said plurality of gaps close due to deformation of said energy absorbing deformable plate.

* * * * *